Sept. 7, 1943. J. R. HEILMAN 2,329,116
BIMETALLIC VALVE FOR AUTOMATIC COFFEE MAKERS
Filed Jan. 6, 1942
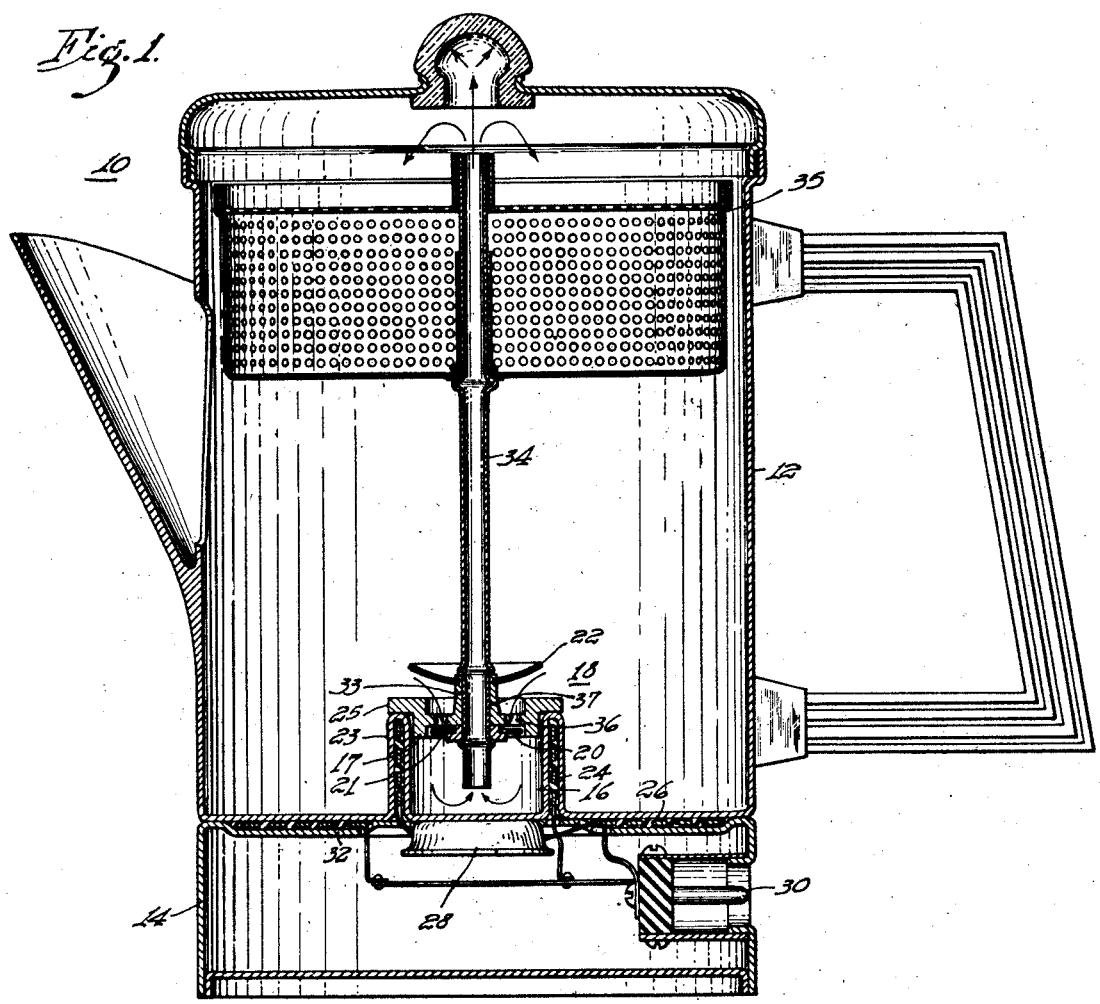
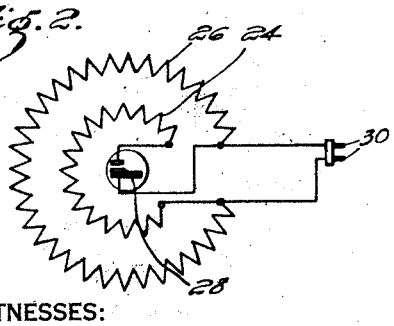
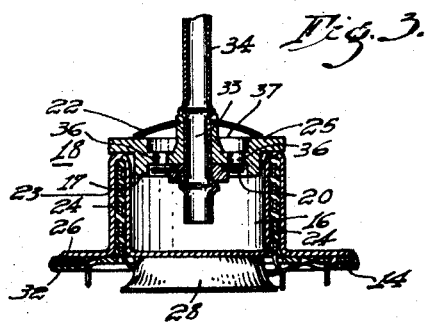
WITNESSES:
INVENTOR
Joseph R. Heilman.
BY
ATTORNEY Patented Sept. 7, 1943

2,329,116

UNITED STATES PATENT OFFICE 2,329,116

BIMETALLIC VALVE FOR AUTOMATIC
COFFEE MAKERS

Joseph R. Heilman, Mansfield, Ohio, assignor to Westinghouse Electric & Manufacturing Company, East Pittsburgh, Pa., a corporation of Pennsylvania Application January 6, 1942, Serial No. 425,768

7 Claims. (Cl. 219—43)

My invention relates to percolators and, more particularly, to automatic temperature-controlled percolators.

An object of my invention is to provide a percolator structure having a plurality of heating elements and a control therefor which automatically controls the energization of at least one of the elements so as to reduce the heat output to maintain the brewed coffee at a serving temperature after the coffee has been brewed.

A further object of my invention is to provide a percolator structure having a vaporizing chamber, the walls of which carry the main heating element, and a thermostat in thermal communication with said chamber for regulating the energization of said element.

Still another object of my invention is to provide a valve structure for a percolator vaporizing chamber which embodies a bimetallic member for automatically preventing the flow of liquid into the vaporizing chamber when the temperature of the liquid is at a predetermined value.

A still further object of my invention is to provide a percolator structure having a main heating element, a secondary heating element, and a thermostatic switch that deenergizes the main heating element after the liquid within the percolator has reached a predetermined temperature, the secondary heating element then maintaining the liquid at a somewhat lower predetermined or serving temperature.

Other objects of my invention will either be pointed out specifically in the course of the following description of a device embodying my invention, or will be apparent from such description.

In the accompanying drawing:

Figure 1 is a sectional view of a percolator embodying my invention;

Fig. 2 is a schematic wiring diagram illustrating the circuit employed in the percolator shown in Fig. 1; and Fig. 3 is a sectional view illustrating a portion of the structure shown in Fig. 1 in a closed or inoperative position.

Referring to the accompanying drawing, I show a percolator 10 embodying a fluid container 12, a base 14, a vaporizing chamber 16 positioned at the bottom of said container, a valve structure 18 which rests upon the chamber 16, forming the top thereof, a disk-valve 20 positioned within the valve structure 18 for regulating the flow of liquid into the chamber 16, a bimetallic valve 22 attached to the structure 18 for preventing the flow of liquid into the chamber 16 under predetermined conditions, a main heating element 24 positioned about the vaporizing chamber 16 for heating the liquid to a brewing temperature, a secondary heating element 26 for maintaining the brewed coffee at serving temperature, a thermostat 28 operating in response to the temperature within the chamber 16 for controlling the energization of the main heating element, and an electrical cord receptacle 30 which provides means for energizing the heating elements.

The fluid container 12, illustrated as being cylindrical in shape, has a relatively small upwardly extending or folded circular portion 23 formed within the central portion of its base for receiving the main heating element 24. This portion 23 forms a small chamber within the container 12. Said chamber is utilized as the vaporizing chamber 16 for heating the liquid to be brewed, as hereinafter described. The inner diameter of the portion 23 or vaporizing chamber 16 is preferably substantially equal to that of the body member 17 of valve structure 18, and is adapted to receive about its upper edge the horizontal flange 25 of said valve structure so as to locate and support said structure within the fluid container 12. The valve structure 18 resting upon the upstanding walls 23 of the vaporizing chamber 16 thus forms the top of said chamber, and regulates the flow of liquid therein, as hereinafter described.

The base 14, as well as container 12, is formed of a light sheet metal material in keeping with established practice. The upper surface of the base 14 has a depressed annular portion 32 for receiving the secondary heating element 26. In addition, an opening is formed in the side of the base to receive the cord receptacle means 30. An operator may then connect an ordinary appliance cord to the receptacle means 30 and to a power supply (not shown) to energize the percolator heating elements 24 and 26 when it is desired to brew coffee.

The valve structure 18 comprises the flipper or loosely mounted disk-valve 20 and the bimetallic element 22, which functions as a valve, mounted upon the cylindrical body 17 having a circular flanged collar or washer-like member 25. Said member rests upon the upwardly extending annular portion 23 so as to form the upper portion of the vaporizing chamber 16. A valve stem 33 on the lower end of percolator tube 34 passes through the members 23 and 25 and is rigidly attached thereto. The tube 34 supports a coffee grounds basket 35 at its upper end. Said tube 34 and valve stem 33 are hollow so as to permit the upward passage of heated fluid therethrough, in a manner hereinafter described.

A plurality of vertically extending apertures 36 are located in the central portion of the body member 17 to permit the flow of fluid into the vaporizing chamber 16. Said apertures 36 are positioned below the annular disk-valve 20 which is loosely positioned within an annular groove surrounding a central post 37 in the member 17. The disk-valve 20 is free to move vertically so as to block the apertures 36 and, when in its upper position, prevents the passage of fluid through said apertures, as hereinafter described.

The small circular bimetallic element or valve 22 of the well-known snap-acting disc type is, in this instance, rigidly attached at its mid-point to the central post 37 of member 17 of valve structure 18 above the disk-valve 20 and the main portion of member 25. The bimetallic element 22 is normally flexed in a concave upwardly position, as shown in Fig. 1 and is responsive to the temperature of the liquid within the fluid chamber 12. As the temperature of the fluid or coffee brew increases, in response to the energized heating elements, the element 22 will likewise be heated, and at a predetermined temperature value, say 180 to 200 degrees Fahrenheit, said element will flex to its concave downwardly position, as shown in Fig. 3. The periphery of said bimetallic element 22 will then engage a top surface of the member 25 so as to act as a valve and prevent the flow of liquid into the vaporizing chamber 16.

A thermostat 28 is positioned or located within the base 14 below the vaporizing chamber 16 and as close thereto as is physically possible. No details of the thermostat 28 are illustrated in Figs. 1 and 2, it being understood that any suitable structure may be used such as another disc-type snap-acting element like member 22 for controlling a circuit in accordance with a familiar practice. The thermostat 28, being attached to the bottom of the vaporizing chamber 16, operates in direct response to the temperature within said chamber 16, and is adapted to open at a higher temperature value than causes thermostat 22 to close. Said thermostat is connected in series with the main element 24 and deenergizes said element when the temperature of the vaporizing chamber increases to a predetermined value.

The main heating element 24 is positioned within the walls of the vaporizing chamber 16 and may be formed in any desired manner. Said heating element 24 supplies heat to the liquid in the container 12 and a relatively large and concentrated quantity of heat to the fluid within the vaporizing chamber 16. The fluid or liquid in chamber 16 is thus partially vaporized and increases in pressure so as to first raise and close the disk-valve 20 and then raise the fluid in said chamber upwardly through the valve stem 33 and tube 34 into basket 35, in a well known manner.

The secondary heating element 26 is a relatively flat washer-like or annular structure positioned below the bottom wall of container 12 within the depressed portion 32 of the upper surface of the base 14 and is insulated from the liquid containing vessel 12 and the base 14. Said heating element 26 supplies a relatively small amount of heat to the fluid located within the vessel or container 12. The heat furnished by said element 26 is sufficient to maintain the temperature of the brew of the brewed coffee substantially at a desired serving temperature after the deenergization of the main heating element 24 by thermostat 28.

Referring to Fig. 2, it will be noted that the secondary heating element 26 is connected directly to the receptacle means 30 independently of thermostat 28. In addition, it will be noted that the main heating element 24 is connected to the receptacle means 30 through the thermostat 28. It is, therefore, obvious that, when the appliance embodying my invention is connected to a power supply (not shown), the secondary heating element 26 will be energized at all times, so as to maintain the brew at a serving temperature, and the main heating element 24 will be energized only when thermostat 28 is closed or during the brewing period.

When operating the percolator embodying my invention, an operator deposits a desired amount of coffee grounds within the basket 35, as well as the necessary amount of water within the fluid container 12. The heating elements 24 and 26 are then connected to an electrical power supply (not shown) by means of an electrical appliance cord (not shown) which is plugged into the cord receptacle means 30. The two heating elements then supply heat to the fluid in container 12. However, the main heating element 24 supplies concentrated heat to the vaporizing chamber 16 so as to cause the water in said chamber to rapidly heat and become partially vaporized, increasing the pressure thereof.

As the fluid in chamber 16 increases in temperature and pressure, the disk-valve 20 is forced upwardly against the lower surface of member 17, thereby closing the ports or apertures 36 therein. The passage of fluid through said apertures 36 is thus prevented. However, as the fluid continues to heat, it is finally forced by the vapor pressure upwardly through tube 34 into the coffee basket 35, where said water percolates through the coffee grounds to make the coffee brew.

With a reduced pressure in chamber 16 the disk-valve 20 drops back down to its lower position, permitting more liquid to enter into the chamber 16 so as to be raised, in the manner described, to the basket 35. Therefore, with a continued passage of water through the vaporizing chamber and the coffee basket 35, said water slowly changes into a coffee brew. In addition, the temperature of the water or coffee brew thus increases. Then, as the temperature of the brew arrives at a predetermined value approximately 180 to 200 degrees Fahrenheit, the bimetallic valve 22 snaps to its closed or concave downwardly position, at which time the peripheral edge of the bimetallic valve engages the valve structure portion 25, as shown in solid lines in Fig. 3, so as to prevent the flow of the brew into the vaporizing chamber 16.

The temperature within the vaporizing chamber 16 then rapidly increases, and within a short time, the temperature thereof is sufficient to actuate the thermostat 28 (approximately 230 to 250 degrees Fahrenheit), which is responsive thereto, to deenergize the main heating element 24. The temperature of the brewed coffee then decreases to a predetermined serving value, where it is substantially maintained by the secondary heating element 26, as previously described in connection with the diagram of Fig. 2. Said secondary heating element 26 will hold the temperature of the brewed coffee at this serving temperature practically indefinitely without changing the characteristics of the brew.

After the percolator has been emptied of the coffee brew and disconnected from the power supply, the temperature thereof will decrease to substantially room temperature. The thermostat 28 will close prior to the percolator decreasing in value to room temperature so as to permit an operator to again brew coffee within the percolator structure. In addition, as the temperature within the percolator decreases, the bimetallic disk 22 will likewise flex to a concave upwardly position, as shown in Fig. 1 to permit the flow of fluid into said vaporizing chamber when the container 12 is next supplied with water. However, it is to be understood that said bimetallic disk valve 22 will open and the thermostat 28 will reenergize the main heating element, during a relatively continuous operation of the percolator, if an operator should recharge the percolator with fresh relatively cool water.

It will, therefore, be seen that I have provided a percolator structure which, as the fluid or brew therein increases in temperature to a predetermined value, will prevent the flow of fluid into the vaporizing chamber so as to deenergize the main heating element whereupon the secondary heating element will maintain the brew at the desired serving temperature.

Various modifications may be made in the device embodying my invention without departing from the spirit and scope thereof, and I desire, therefore, that only such limitations shall be placed thereon as are imposed by the prior art and the appended claims.

I claim as my invention:

1. A percolator comprising in combination, a fluid container, a vaporizing chamber, a main heating element for supplying heat to said vaporizing chamber, a valve for intermittently preventing the flow of liquid into said vaporizing chamber, a bimetallic valve member responsive to the temperature of the fluid within said fluid container during the continued use of the percolator for preventing the flow of liquid into the vaporizing chamber after a relatively high temperature is exceeded, a thermostat responsive to a still higher temperature for deenergizing said main heating element subsequent to the action of said bimetallic valve member, and a second heating element for maintaining a predetermined temperature within said container after the deenergization of the main heating element.

2. A percolator comprising, in combination, a fluid retaining chamber, a vaporizing chamber, a heating element for heating the fluid within said vaporizing chamber, and a bimetallic valve for preventing the flow of fluid into said vaporizing chamber after a predetermined relatively high temperature of the fluid is exceeded whereby the temperature in said vaporizing chamber rapidly increases, means responsive to such rapidly increasing temperature for deenergizing said heating element, and a second heating element for thereupon maintaining the fluid in said retaining chamber at a second predetermined temperature.

3. A control system for a percolator operable at two heating temperatures and having heating means and a vaporizing chamber, comprising, in combination, a thermally-responsive valve mechanism for the vaporizing chamber for preventing the flow of liquid into said chamber after a predetermined high temperature is exceeded, and a thermostat responsive to a certain increase in the temperature of the vaporizing chamber caused by such action of said valve mechanism for deenergizing a portion of said heating means, the remaining portion of the heating means maintaining the brew at a serving temperature.

4. In a percolator having a main vessel, a basket, a vaporizing chamber, a valve tube for supporting said basket positioned above said chamber and a disk valve for regulating the flow of liquid into said chamber, the combination of a main heating element positioned about said vaporizing chamber, a second heating element, a bimetallic valve member positioned above said chamber and about the valve tube for preventing the flow of liquid into said chamber at a predetermined temperature of the liquid, and a thermostat for deenergizing the main heating element after the liquid has obtained said temperature, said second heating element functioning independently of the thermostat for maintaining the liquid at a second predetermined temperature.

5. In a percolator having a main vessel for retaining a fluid, a coffee-grounds receiving basket, a valve stem for supporting said basket, a vaporizing chamber and a valve structure comprising the upper portion of said chamber, the combination of a bimetallic valve retained by the valve stem in close relation to said valve structure and normally flexed away therefrom, said bimetallic valve being responsive to the temperature of the fluid in the main vessel and flexing into contact with the valve structure when the fluid has reached a predetermined value.

6. In a percolator having a main vessel for retaining a fluid, a coffee-grounds receiving basket, a valve stem for supporting said basket, a vaporizing chamber and a valve structure comprising the upper portion of said chamber, the combination of a bimetallic valve retained by the valve stem in close relation to said valve structure and normally flexed away therefrom, a heating element for supplying heat to the fluid, said bimetallic valve being responsive to the temperature of the fluid in the main vessel and flexing into contact with the valve structure when the fluid has reached a predetermined value, to prevent the passage of fluid into said vaporizing chamber whereby the temperature of said chamber will increase above its normal operating value, and a thermostat responsive to the temperature of said chamber for deenergizing at least a part of said heating element when the temperature of the vaporizing chamber reaches a predetermined value above its normal operating value.

7. In a percolator having a main vessel for retaining a fluid, a coffee-grounds receiving basket, a valve stem for supporting said basket, a vaporizing chamber and a valve structure comprising the upper portion of said chamber, the combination of a bimetallic valve retained by the valve stem in close relation to said valve structure and normally flexed away therefrom, a heating element for supplying heat to the fluid, said bimetallic valve being responsive to the temperature of the fluid in the main vessel and flexing into contact with the valve structure when the fluid has reached a predetermined value, to prevent the passage of fluid into said vaporizing chamber whereby the temperature of said chamber will increase above its normal operating value, a thermostat responsive to the temperature of said chamber for deenergizing a part of said heating element when the temperature of the vaporizing chamber reaches a predetermined value above its normal operating value, the remaining portion of said heating element maintaining the coffee or fluid in the main vessel at a predetermined serving temperature.

JOSEPH R. HEILMAN.